United States Patent
Chu et al.

(10) Patent No.: US 8,625,570 B2
(45) Date of Patent: Jan. 7, 2014

(54) ROBUST UNICAST/BROADCAST/MULTICAST COMMUNICATION PROTOCOL

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1014 days.

(21) Appl. No.: 12/494,122

(22) Filed: Jun. 29, 2009

(65) Prior Publication Data

US 2010/0165963 A1 Jul. 1, 2010

Related U.S. Application Data

(60) Provisional application No. 61/142,146, filed on Dec. 31, 2008.

(51) Int. Cl.
*H04J 3/24* (2006.01)
(52) U.S. Cl.
USPC ......... 370/349; 370/461; 370/338; 455/452.1
(58) Field of Classification Search
None
See application file for complete search history.

(56) References Cited

U.S. PATENT DOCUMENTS

| | | | | |
|---|---|---|---|---|
| 7,483,412 B2* | 1/2009 | Abhishek et al. | ............ | 370/338 |
| 7,564,826 B2* | 7/2009 | Sherman et al. | ............ | 370/338 |
| 7,903,624 B2* | 3/2011 | Malik et al. | .................. | 370/338 |
| 8,031,661 B2* | 10/2011 | Wentink | ...................... | 370/329 |
| 8,116,295 B2* | 2/2012 | Reumerman et al. | ......... | 370/348 |
| 2007/0149230 A1* | 6/2007 | Song et al. | .................... | 455/515 |
| 2008/0144588 A1* | 6/2008 | Mezer et al. | ................. | 370/338 |
| 2012/0044924 A1* | 2/2012 | Ji et al. | ......................... | 370/338 |

\* cited by examiner

*Primary Examiner* — Steven H Nguyen
*Assistant Examiner* — Henry Baron
(74) *Attorney, Agent, or Firm* — Seed IP Law Group PLLC

(57) ABSTRACT

Methods and apparatus for implementing a robust unicast/broadcast/multicast protocol are provided. In one aspect, a method of avoiding collision of intra-basic service set unicast, broadcast or multicast transmissions notifies stations in the basic service set of a reserved transmit opportunity for a unicast, broadcast or multicast transmission. Transmissions from at least one station in the basic service set are deferred until after the reserved unicast, broadcast or multicast transmit opportunity.

14 Claims, 16 Drawing Sheets

ROBUST UNICAST/BROADCAST/MULTICAST COMMUNICATION PROTOCOL

CROSS-REFERENCE TO RELATED APPLICATION

This application claims the benefit under 35 U.S.C. §119(e) of U.S. Provisional Patent Application Ser. No. 61/142,146, filed Dec. 31, 2008, entitled "Robust Broadcast/Multicast Communication Protocol," which is incorporated herein by reference in its entirety.

BACKGROUND

1. Technical Field

This disclosure generally relates to the field of transmission of audio and video streams in wireless local area network (WLAN) communications and, more particularly, to quality of service for multicast and broadcast of audio/video streams in WLAN communications.

2. Description of the Related Art

In recent years, wireless computer networks such as WLANs have been widely deployed in places ranging from homes and businesses to hotels, airports, schools, etc. Compared to wire networks, a WLAN provides users mobile connectivity and are typically more scalable and require lower cost in network construction. With the popularity of multimedia applications like streaming multimedia and voice over IP on the rise, it is important to ensure quality of service in the delivery of time-sensitive multimedia content in a WLAN.

Within the IEEE 802.11 WLAN standards, two access protocols at the MAC layer are defined: the mandatory distributed coordination function (DCF) and the optional point coordination function (PCF). The DCF protocol uses a carrier sense multiple access with collision avoidance (CSMA/CA) method to decide which station in the WLAN should send packets out. The WLAN stations listen to the wireless medium to determine when it is free, or idle. Once a station detects that the medium is idle, the station begins to decrement its back-off counter. Each station maintains a contention window (CW) that is used to determine the number of slot times a station has to wait before transmission. The back-off counter only begins to decrement after the medium has been idle for a DCF inter-frame space (DIFS) period. If the back-off counter expires and the medium is still idle, the station begins to transmit. Thus, it is possible that two stations may begin to transmit at the same time, in which case a collision occurs. If a frame is successfully received by the destination the frame is addressed to, the destination sends an acknowledgement (ACK) frame to notify the source of the successful reception. However, as there is no centralized coordination in DCF, a relatively high number of collisions still occur especially in a WLAN with high load.

In an infrastructure basic service set (BSS) with a WLAN, typically including an access point (AP) and associated non-AP stations (STAs), centralized coordination can be achieved when using the PCF protocol as PCF requires the AP to poll the stations to coordinate access to the wireless medium. However, PCF is rarely implemented as the implementation is complicated because AP has to poll the non-AP stations for the transmission of each polled packet. Additionally, it is difficult to integrate an effective power saving mode with the PCF protocol.

The IEEE 802.11e is an approved amendment that defines a set of quality of service enhancements for WLAN applications through modification to the media access control (MAC) layer. Specifically, the IEEE 802.11e enhances the DCF and PCF protocols through the hybrid coordination function (HCF). The HCF includes two protocols of channel access: enhanced distributed channel access (EDCA) and HCF controlled channel access (HCCA). As the HCCA protocol uses contention free periods to transmit data streams, it makes efficient use of the bandwidth. However, implementation of the HCCA protocol tends to require a relatively complex scheduler and added complexity. With the EDCA protocol, data streams are assigned different priorities and thus high-priority data streams have a higher chance of being transmitted than low-priority data streams. Each priority level is assigned a respective Transmit Opportunity (TXOP), which is a time interval during which a station in a BSS can transmit as many frames as possible.

Video streams require reliable transmission and deterministic delay. At current time it is difficult, however, to provide reliable video transmission in an IEEE 802.11-based WLAN because of insufficient support of broadcast and multicast transmissions. For example, an intra-BSS collision occurs if associated stations transmit frames when the AP is transmitting broadcast/multicast frames. When two or more BSS's overlap each other, an overlapping BSS (OBSS) or inter-BSS collision might occur. The collision may happen, for example, if a station or the AP of a first BSS transmits frames when an AP of a second BSS that overlaps the first BSS is transmitting broadcast/multicast frames. Furthermore, there is no feedback mechanism to indicate the correct reception of the broadcast/multicast frames transmitted by the AP.

In addition, the EDCA protocol currently does not provide deterministic delay guarantee. Although there are efforts made to include a reservation-based medium access method in the IEEE 802.11n and 802.11s drafts, a number of issues still need to be addressed in order to provide reliable reserved medium access for transmission of video streams. For example, issues related to coexistence with legacy OBSS and coexistence with or without OBSS should be considered.

BRIEF SUMMARY

A method of avoiding collision of intra-basic service set unicast, broadcast or multicast transmissions may be summarized as including notifying stations in the basic service set of a transmit opportunity for a reserved time interval for a unicast, broadcast or multicast transmission; and deferring transmission from at least one station in the basic service set until after the reserved time interval. In one embodiment, notifying the stations in the basic service set of the transmit opportunity may include broadcasting an information element related to the transmit opportunity in at least one beacon or action frame to the stations in the basic service set. In another embodiment, broadcasting an information element related to the transmit opportunity may include broadcasting at least one of the following: an active indication to indicate whether or not the transmit opportunity is currently enabled, an activation start time to indicate a time when the transmit opportunity will be enabled if the transmit opportunity is not currently enabled, a transmit opportunity type, a source address, a destination address, a service interval, an offset to the service interval, and a duration of the transmit opportunity. In one embodiment, notifying the stations in the basic service set of the transmit opportunity may include broadcasting the transmit opportunity using a delivery traffic indication message (DTIM) beacon to stations in the basic service set. In another embodiment, deferring transmission from at least one station in the basic service set until after the reserved time interval may include setting a network allocation vector (NAV) in the at least one station in the basic service set to stop frame transmission during the reserved time interval.

A method of avoiding collision of inter-basic service set unicast, broadcast or multicast transmissions may be summarized as including reserving a first unicast, broadcast or multicast transmit opportunity in a first basic service set; reserving a second unicast, broadcast or multicast transmit opportunity in a second basic service set that overlaps the first basic service set; exchanging information related to the respective reserved transmit opportunity between the first and the second basic service sets; determining a difference of timing synchronization function (TSF) values between the first and the second basic service sets; determining if an overlap between the reserved transmit opportunities of the first and the second basic service sets exists based on the difference between the TSF values; and contending for medium access right using the EDCA protocol during the respective reserved transmit opportunity in at least one of the first and the second basic service sets. In one embodiment, exchanging information related to the respective reserved transmit opportunity between the first and the second basic service sets may include exchanging information related to the respective reserved transmit opportunity between the first and the second basic service sets through relayed action management frames using stations of the first and the second basic service sets. In one embodiment, the method may further include recording at an access point of at least one of the first and the second basic service sets the difference of the TSF values between the first and the second basic service sets to calculate an overlap between the reserved transmit opportunities of the first and the second basic service sets. In another embodiment, the method may further include selecting in the first basic service set a new unicast, broadcast or multicast transmit opportunity not overlapping the reserved second transmit opportunity of the second basic service set when the reserved first transmit opportunity of the first basic service set overlaps the reserved second transmit opportunity of the second basic service set.

A method of avoiding collision of inter-basic service set unicast, broadcast or multicast transmissions may be summarized as including reserving a first transmit opportunity in a first basic service set; reserving a second transmit opportunity in a second basic service set that overlaps the first basic service set, the second transmit opportunity overlapping the first transmit opportunity; randomly selecting a respective priority number for each of the first and the second basic service sets to provide one of the first and the second basic service sets with a higher priority number and the other with a lower priority number when the second transmit opportunity overlaps the first transmit opportunity at least partially; and releasing the reserved transmit opportunity by the basic service set having the lower priority number. In one embodiment, the method may further include selecting a new transmit opportunity for the one of the first and the second basic service sets having the lower priority number, the new transmit opportunity for the basic service set having the lower priority number not overlapping the transmit opportunity reserved in the basic service set having the higher priority number.

A method of avoiding collision of inter-basic service set unicast, broadcast or multicast transmissions may be summarized as including detecting an overlap between a transmission range of a first basic service set and a transmission range of a second basic service set; and respectively selecting at least one of a service interval, an offset, and a duration based on a default beacon interval or a default DTIM beacon interval in reserving a transmit opportunity for a unicast, broadcast or multicast transmission in each of the first and the second basic service sets. In one embodiment, the first basic service set may have a first beacon interval and the second basic service set may have a second beacon interval where the first beacon interval and the second beacon interval are different. In one embodiment, respectively selecting at least one of a service interval, an offset, and a duration based on the default beacon interval or the default DTIM beacon interval in reserving a transmit opportunity for a unicast, broadcast or multicast transmission in each of the first and the second basic service sets may include reserving a first transmit opportunity in the first basic service set based on the default beacon interval or the default DTIM beacon; and reserving a second transmit opportunity in the second basic service set based on the default beacon interval or the default DTIM beacon, the first transmit opportunity and the second transmit opportunity not overlapping. In one embodiment, the method may further include indicating in an information element of the reserved transmit opportunity a difference between a first beacon interval of the first basic set and the default beacon interval. In another embodiment, the method may further include adjusting a reserved service interval if the reserved service interval covers a first beacon interval of the first basic service set before the adjusting.

A circuit in a first wireless communication device of a first basic service set may be summarized as including communication logic configured to generate a transmit opportunity information element to reserve a transmit opportunity for a unicast, broadcast or multicast transmission, the communication logic further configured to cease transmission by the first wireless communication device during a transmit opportunity reserved by another wireless communication device. In one embodiment, the communication logic may be further configured to contend for medium access rights using the EDCA protocol during the reserved transmit opportunity. In another embodiment, the communication logic may be further configured to randomly select a priority number if the reserved transmit opportunity overlaps a reserved transmit opportunity of a second basic service set, to release the reserved transmit opportunity if the randomly selected priority number is lower than a randomly selected priority number for the second basic service set, and to select a new transmit opportunity not overlapping the reserved transmit opportunity of the second basic service set. In yet another embodiment, the communication logic may be further configured to use a default beacon interval or a default delivery traffic indication message (DTIM) beacon interval to select at least one of a service interval, an offset, and a duration in reserving a transmit opportunity for the unicast, broadcast or multicast transmission.

DETAILED DESCRIPTION

As used herein, the term "broadcast" generally refers to transmission of wireless signals to one or more unspecified devices capable of receiving wireless signals. The term "broadcast" may further refer to wireless transmission of data, audio, and/or video packets from an access point of a basic service set to all stations of the basic service set in the context of a local area network such as a WLAN.

As used herein, the term "multicast" generally refers to transmission of wireless signals to a plurality of specified destinations or devices capable of receiving wireless signals. The term "multicast" may further refer to wireless transmission of data, audio, and/or video packets from an access point of a basic service set to a subset of the stations of the basic service set in the context of a local area network such as a WLAN.

As used herein, the term "unicast" generally refers to transmission of wireless signals to a specified destination or device capable of receiving wireless signals. The term "unicast" may further refer to wireless transmission of data, audio, and/or video packets from an access point of a basic service set to one of the stations of the basic service set in the context of a local area network such as a WLAN. The term "unicast" may also further refer to wireless transmission of data, audio, and/or video packets from one of the stations of a basic service set to one of the stations of the same basic service set in the context of a local area network such as a WLAN.

As used herein, the term "transmission" generally refers to transmission of wireless signals to any number of devices capable of receiving wireless signals via broadcast, multicast or unicast. The term "transmission" may further refer to wireless transmission of data, audio, and/or video packets from an access point or a station of a basic service set to any number of the stations and access points in a basic service set and any overlapping basic service set in the context of a local area network such as a WLAN.

Figure 1B:
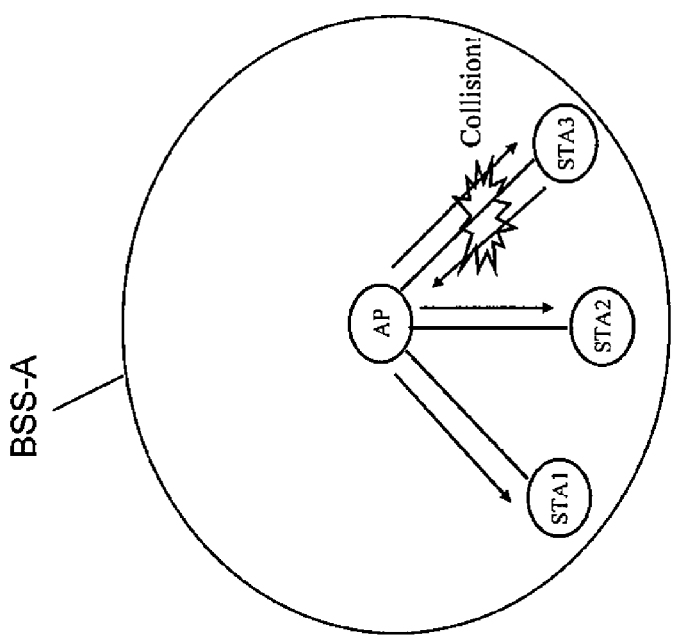
FIGS. 1A and 1B are each a simplified diagram of intra-basic service set collision or inter-BSS collision using conventional broadcast or unicast methods.
Figure 1A:
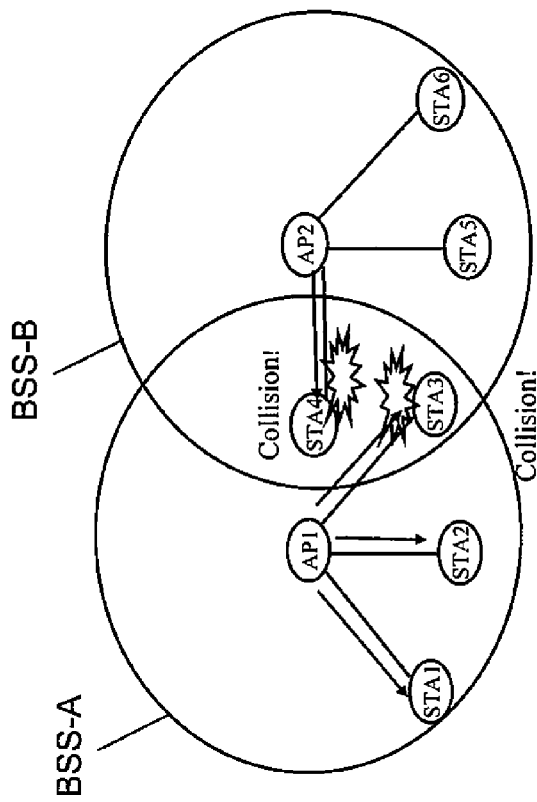

FIG. 1 illustrates intra-basic service set collision and inter-basic service set collision using conventional unicast, broadcast or multicast methods. An intra-basic service set collision can occur when one or more stations in the basic service set transmits frames when the access point is transmitting unicast, broadcast or multicast frames to some or all the stations in the basic service set. As shown in FIG. 1A, for example, an intra-basic service set collision occurs when station STA3 transmit frames while access point AP is transmitting unicast, broadcast or multicast frames to some or all the stations in the basic service set BSS-A. An inter-basic service set collision can occur when an access point transmits unicast, broadcast or multicast frames while one or more stations, or the access point, of an overlapping basic service set transmit frames. As shown in FIG. 1B, for example, an inter-basic service set collision (or overlapping basic service set collision) occurs when the access point AP1 of the basic service set BSS-A transmits unicast, broadcast or multicast frames while the access point AP2 of the basic service set BSS-B is transmitting frames to station STA4 of the basic service set BSS-B. Another shortcoming of the structure of FIG. 1 is that, as there is no feedback required to indicate the correct reception of the broadcast/multicast frames, the conventional scheme of broadcast and multicast of data, audio or video frames is unreliable.

To provide reliable unicast, broadcast and multicast transmission of data, audio or video frames, one approach is to decrease the probability of transmission collisions. Another approach is to provide feedback, such as acknowledgement, in response to receipt of data, audio or video frames transmitted via broadcast or multicast.

Figure 2:
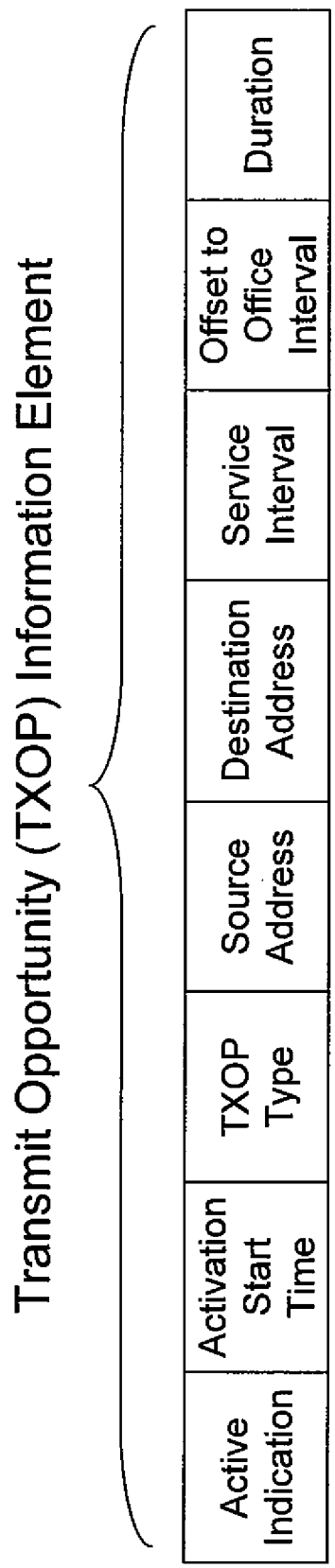
FIG. 2 is a simplified diagram of a reserved video TXOP information element according to one embodiment.

FIG. 2 illustrates a TXOP information element according to one embodiment. In an inventive reservation-based medium access scheme to decrease the probability of transmission collisions, a TXOP information element, which is a set of information, is used to reserve a TXOP time interval. It is believed that reliable transmission and deterministic delay can be achieved by transmission of high-priority frames such as audio and video frames during the reserved TXOP time interval. The reservation of a TXOP time interval is made known by transmission, such as broadcast or multicast, of the TXOP information element to stations in a basic service set. In one embodiment, the access point of a basic service set transmits a TXOP information element to a number of stations in the basic service set to reserve a TXOP time interval for transmission of data, audio or video frames. For example, the access point may broadcast the TXOP information element to all stations in the basic service set to reserve a time interval for transmission of data, audio or video frames to avoid intra-basic service set collisions during the transmission of the data, audio or video frames. Each station, upon being notified of the reserved TXOP time interval, will refrain from transmission during the reserved TXOP time interval. For instance, each station informed of the reserved TXOP time interval will set its network allocation vector (NAV) to refrain from transmission during the reserved TXOP time interval in accordance with the IEEE 802.11 standards.

As shown in FIG. 2, a TXOP information element includes the following fields: an active indication field, an activation start time field, a TXOP type field, a source address field, a destination address field, a service interval field, an offset to service interval field, and a duration field. Alternatively, a TXOP information element may include fewer or more of the fields listed above. In one embodiment, a TXOP information element includes the information needed to reserve one TXOP time interval for transmission of data, audio or video frames during one service interval. A service interval is a period of time sufficiently long to include one or more TXOP time intervals for an access point to transmit data, audio, or video frames, whether by broadcast, multicast, and/or unicast. Alternatively, a TXOP information element may include the information needed to reserve more than one TXOP time intervals.

In one embodiment, the active indication field is set to a first value if and only if the TXOP is currently enabled, and set to a second value if the TXOP is not currently enabled. The activation start time field indicates when the TXOP will be enabled if the active indication is set to the second value indicating the TXOP is not currently enabled. In some embodiments, several transmissions of the TXOP information element with the active indication field set to the second value may be needed in order to ensure all stations in the basic service set have been notified of an imminent TXOP. The TXOP type field indicates whether the TXOP is a one-stage TXOP or a two-stage TXOP. For example, when there is no overlapping basic service set detected, a TXOP will be of the one-stage type as will be described in more detail below. Conversely, if at least one overlapping basic service set is present, the TXOP will be of the two-stage type as will be described in more detail below.

The duration field indicates the length of the reserved TXOP time interval. Under the reservation-based medium access scheme, it is during the reserved TXOP time interval that data, audio or video frames are transmitted to avoid collisions. The source address field indicates the address of the access point for broadcast and multicast transmission in one embodiment. Alternatively, the source address field may indicate the owner of the reserved TXOP, which may be the access point. The destination address field indicates the address or addresses of the intended recipient or recipients of the video frames. For a broadcast transmission, the destination address field indicates the addresses of all the stations in the basic service set. For a multicast transmission, the destination address field indicates the addresses of those stations in the BSS the multicast transmission is directed to. For a unicast transmission, the destination address field indicates the address of the station in the basic service set the unicast transmission is directed to. The service interval field indicates the length of the service interval specific to the access point, and the length may differ from access point to access point. The offset to service interval field indicates an offset between the beginning of transmission of the data, audio or video frames and the beginning of the respective service interval, and the offset may be adjusted according to the traffic on the transmission medium.

Figure 3:
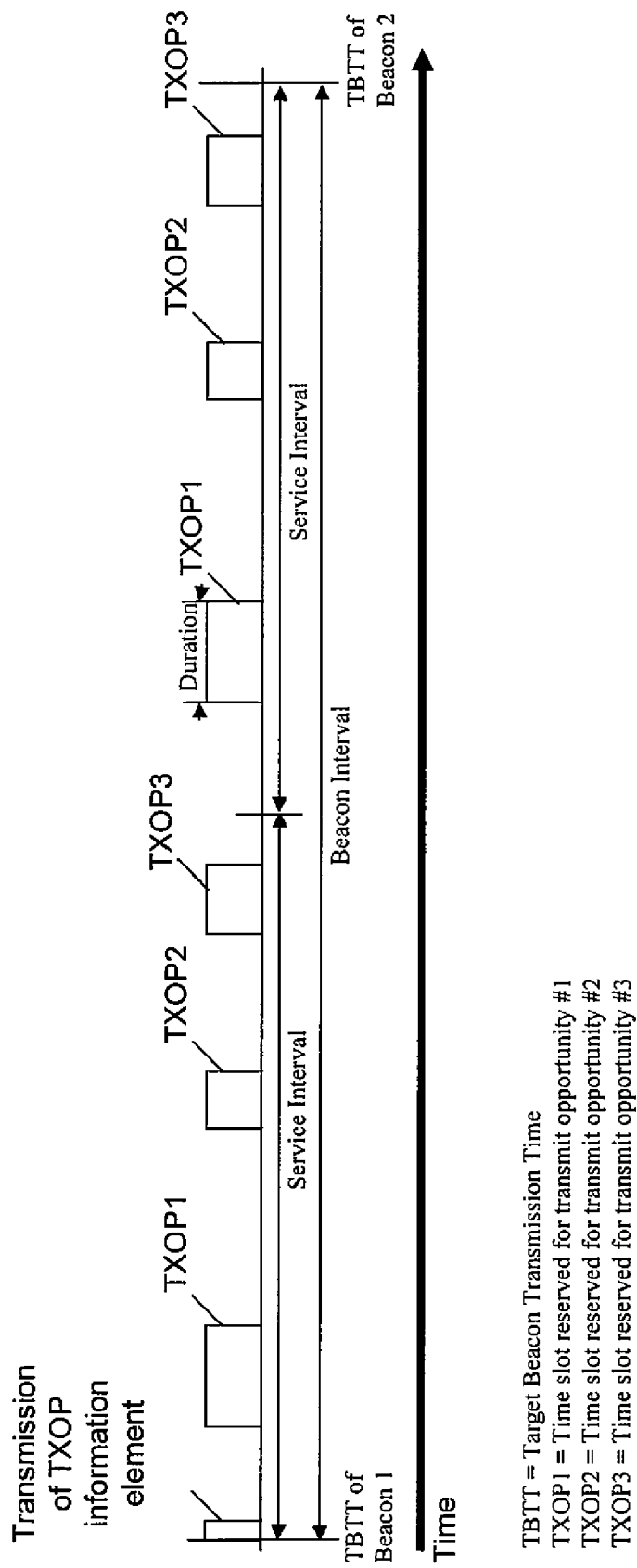
FIG. 3 is a simplified diagram of transmission of video frames during reserved video TXOP according to one embodiment.

FIG. 3 illustrates the relationship between the transmission of TXOP information element and the reserved TXOP time intervals according to one embodiment. A TXOP information element is periodically broadcasted by the access point to the stations in a basic service set in a beacon to reserve one or more TXOP time intervals in a given service interval. In another embodiment, the TXOP information element is periodically broadcasted in an action frame such as a management frame to the stations in the basic service set. The periodic reservation of TXOP time intervals is believed to result in reliable transmission of data, audio or video frames during the reserved TXOP time intervals and deterministic delay.

When there are a number of service intervals between two adjacent beacons broadcasted by the access point, the TXOP information element is used to reserve one or more TXOP time intervals during each of the number of the service intervals between two beacons. For example, as shown in FIG. 3, the TXOP information element broadcasted in beacon 1 reserves the different TXOP time intervals TXOP1, TXOP2, and TXOP3. As there are two service intervals between beacon 1 and beacon 2, the TXOP information element broadcasted in beacon 1 reserves the TXOP time intervals TXOP1, TXOP2, and TXOP3 for both of the service intervals. The TXOP time intervals TXOP1, TXOP2, and TXOP3 may have varying duration depending on the bandwidth requirements. If more data, audio or video frames need to be transmitted after the two service intervals, another TXOP information element will be broadcasted in beacon 2 to reserve more TXOP time intervals in the subsequent service intervals.

An access point reserves TXOP time intervals according to service requirements from the upper layers above the access point's MAC layer or according to service requirements from the stations associated with the access point. Scheduling of the TXOP time intervals depends on the implementation.

Figure 4:
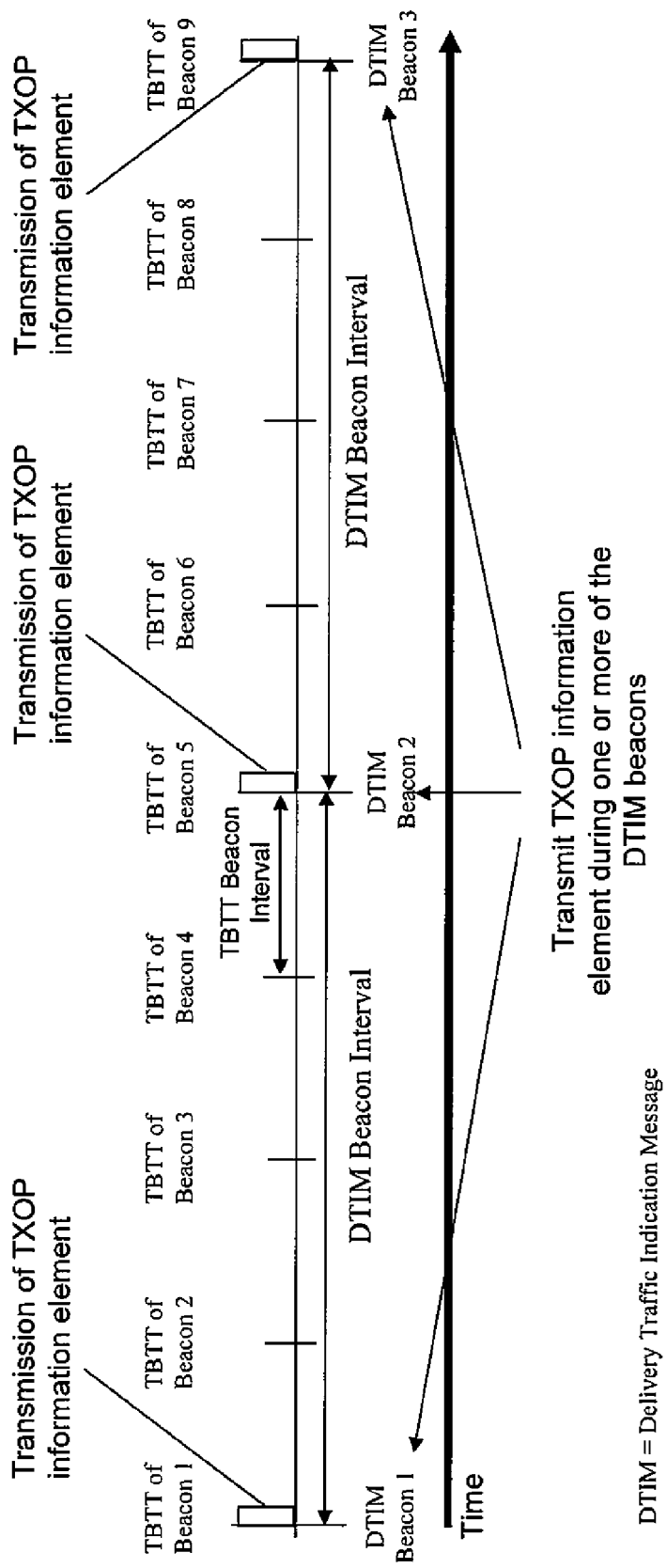
FIG. 4 is a simplified diagram of time spots for broadcast of a reserved video TXOP information element according to one embodiment.

FIG. 4 illustrates the time spots for transmission of a TXOP information element according to one embodiment. The access point should ensure that all stations associated with it receive the TXOP information element. To do so, in one embodiment the access point periodically broadcasts the TXOP information element in one or more beacons plus one or more broadcast TXOP reservation action frames. In case one or more stations in the basic service set are in power saving mode, the access point may periodically broadcast the reserved video TXOP information element in one or more DTIM beacons, as shown in FIG. 4, to ensure that all stations receive the reserved video TXOP information element. In such case, the broadcasted TXOP information element contains the necessary information for reservation of one or more TXOP time intervals for the service intervals between two adjacent DTIM beacons. Alternatively, the TXOP information element may be periodically broadcasted in beacons at one or more target beacon transmission times in addition to being broadcasted in DTIM beacons.

Figure 5:
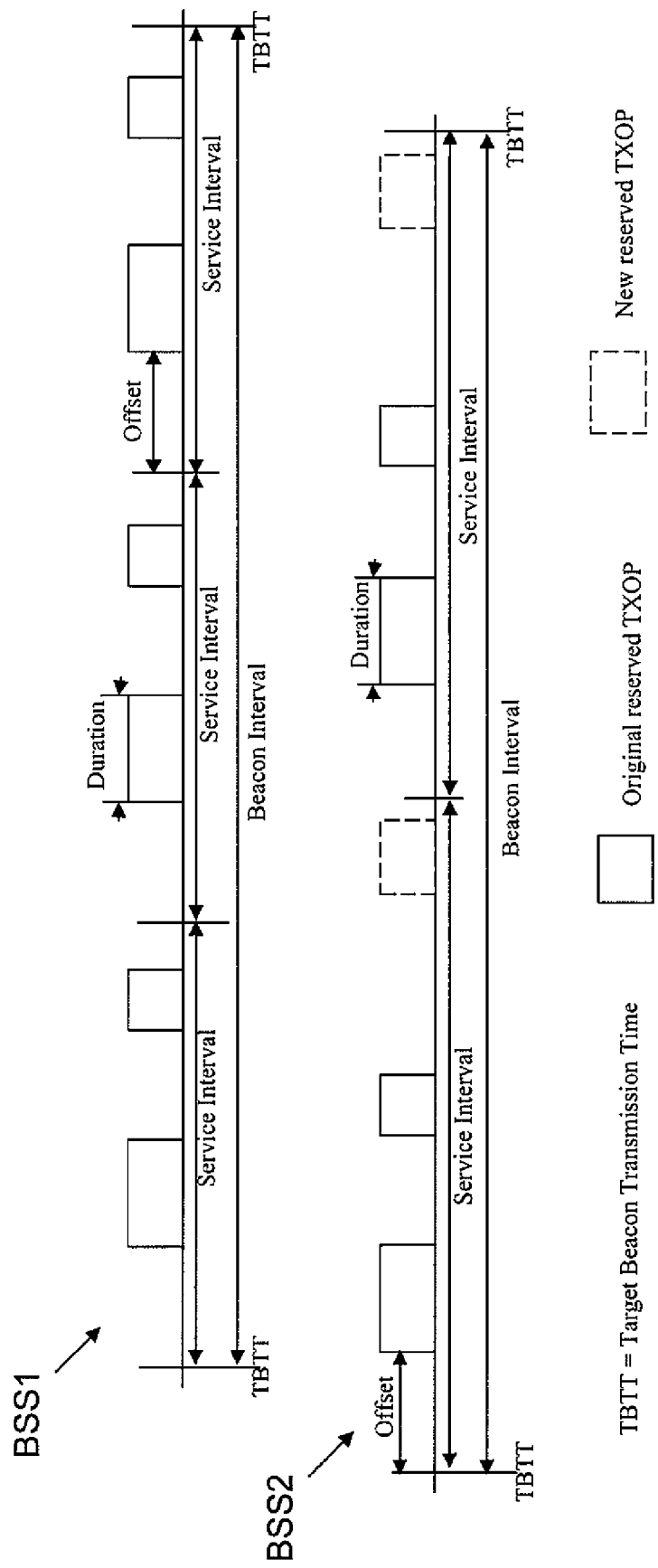
FIG. 5 is a simplified diagram of collision avoidance for inter-basic service set broadcast or multicast transmissions according to one embodiment.

FIG. 5 illustrates collision avoidance for inter-basic service set unicast, broadcast or multicast transmissions according to one embodiment. In one embodiment, two overlapping basic service sets BSS1 and BSS2 exchange information related to their respective reserved TXOP for broadcast or multicast transmission through stations in their respective basic service set. The exchange is through relayed action management frame. For example, if station 1 of the basic service set BSS1 is within the transmission range of the basic service set BSS2 and station 2 of the basic service set BSS2 is within the transmission range of the basic service set BSS1, then information related to the broadcast or multicast TXOP reserved by the basic service sets BSS1 and BSS2 is exchanged through station 1 and station 2 using relayed action management frame.

In one embodiment, the EDCA protocol is used to contend for medium access right during the reserved TXOP. Alternatively, a different protocol (e.g., HCCA) within the IEEE 802.11 standards is used to acquire medium access right.

In one embodiment, the respective access point of each or at least one of the basic service sets BSS1 and BSS2 records the difference of timing synchronization function (TSF) values between the respective basic service set and the overlapping basic service set. Based on the difference of the TSF values, the overlap between the reserved TXOP of the basic service set BSS1 and the reserved TXOP of the basic service set BSS2 can be calculated. As one of the basic service sets BSS1 and BSS2 selects a new TXOP for unicast, broadcast or multicast, the newly selected TXOP should not be the same or overlap the reserved TXOP of the overlapping basic service set in order to avoid collisions. For example, as shown in FIG. 5, when the basic service set BSS2 reserves a new TXOP, the new reserved TXOP is not the same as and does not overlap the reserved TXOP of the basic service set BSS1.

Figure 6:
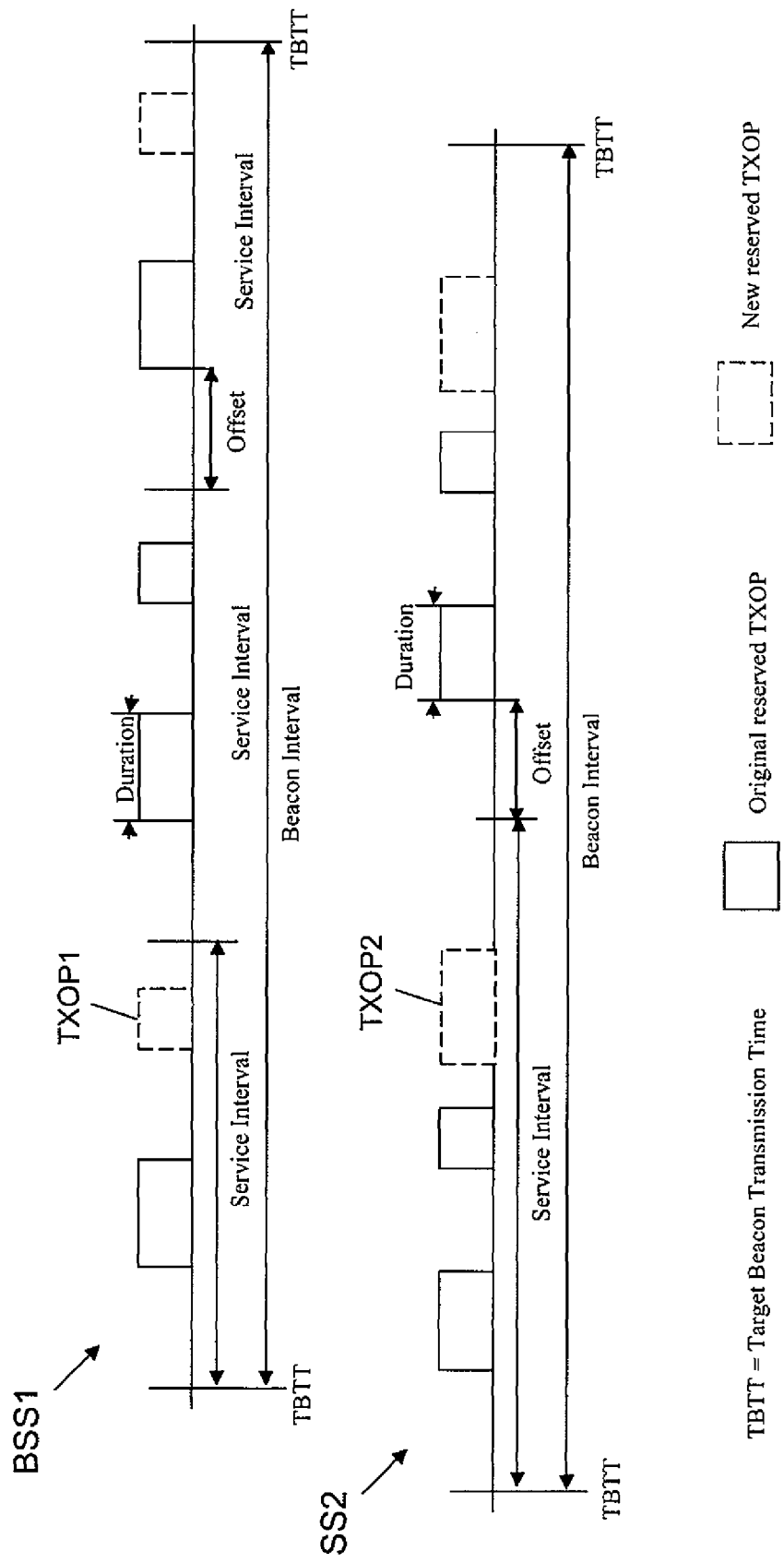
FIG. 6 is a simplified diagram of collision avoidance for inter-basic service set broadcast or multicast transmissions according to another embodiment.

FIG. 6 illustrates collision avoidance for inter-basic service set broadcast or multicast transmissions according to another embodiment. Two overlapping basic service sets BSS1 and BSS2 reserve overlapping TXOP at almost the same time as shown in FIG. 6. In one embodiment, a random priority number is selected for each newly reserved TXOP. The newly reserved TXOP having the lower priority number will be released by the respective basic service set, and a new TXOP is selected to replace the released TXOP.

For example, as shown in FIG. 6, the basic service set BSS1 reserves TXOP1 while the basic service set BSS2 reserves TXOP2 that overlap TXOP1. A priority number is then randomly selected for each of TXOP1 and TXOP2 to determine which one of the newly reserved TXOP1 and TXOP2 should be released by the respective basic service set BSS1 or BSS2. If TXOP1 has a lower priority number than that of TXOP2, then TXOP1 will be released by the basic service set BSS1 as TXOP2 is kept by the basic service set BSS2. Conversely, if TXOP2 has a lower priority number than that of TXOP1, TXOP2 will be released by the basic service set BSS2 as TXOP1 is kept by the basic service set BSS1.

Figure 7A:
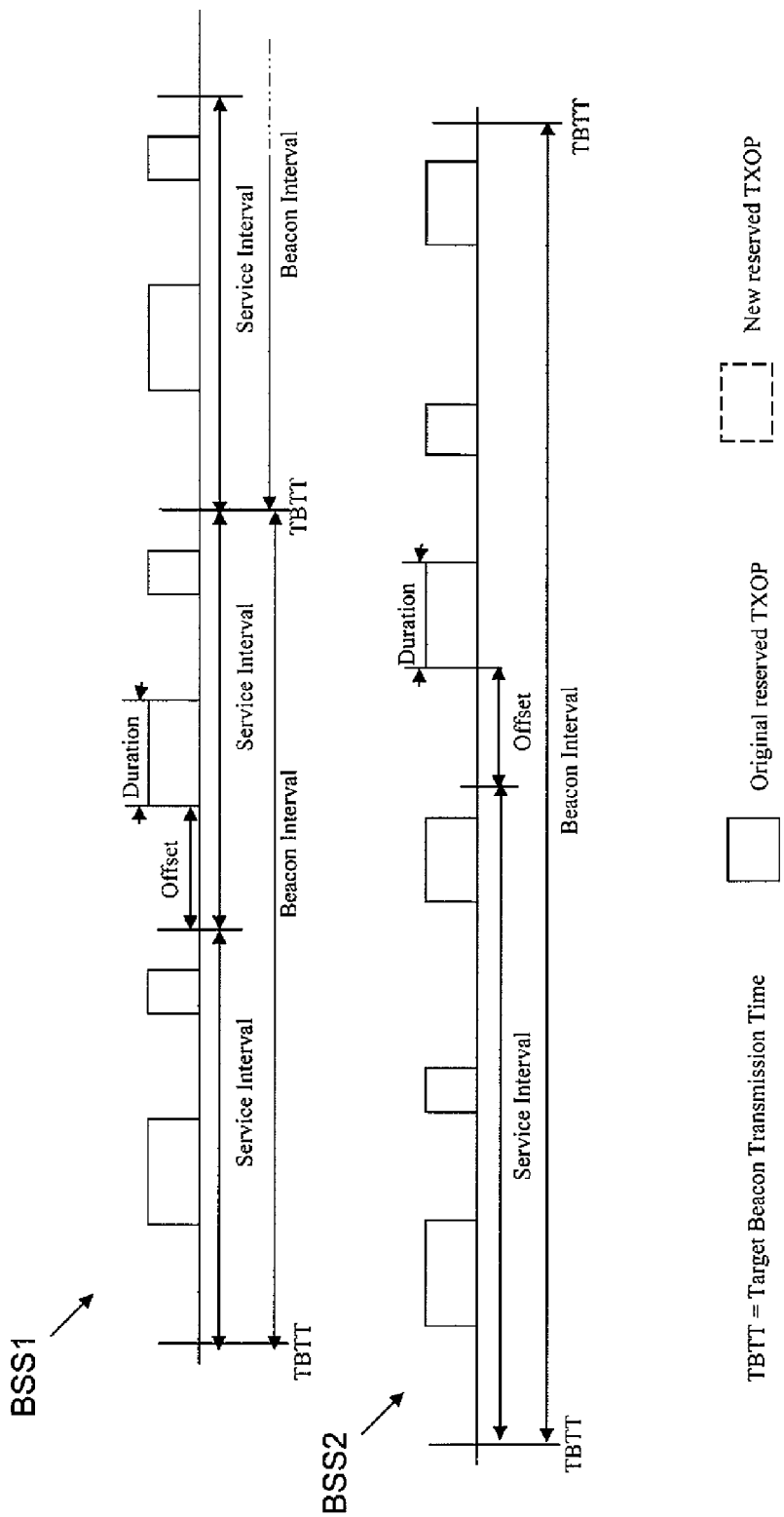
FIG. 7A is a simplified diagram of collisions during inter-basic service set broadcast or multicast transmissions.

FIG. 7A illustrates collisions during inter-basic service set unicast, broadcast or multicast transmissions. Two overlapping basic service sets BSS1 and BSS2 use different beacon intervals. For example, the basic service set BSS1 has a beacon interval that is shorter than the beacon interval of the overlapping basic service set BSS2, as shown in FIG. 7A, or vice versa. If each access point uses its respective beacon interval to select the service interval, offset, and duration of its reserved TXOP, then after some number of beacon intervals the reserved TXOPs of the overlapping basic service sets BSS1 and BSS2 will eventually overlap with each other. This is because the TBTT and the reserved TXOPs of the overlapping basic services sets BSS1 and BSS2 slide at different speeds.

As shown in FIG. 7A, the combined length of two service intervals of the basic service set BSS1 is roughly covered by the combined length of three service intervals of the basic service set BSS2. Even though the reserved TXOPs of the basic service set BSS2 in the first service interval do not overlap with the reserved TXOPs in the first and second service intervals of the basic service set BSS1, the reserved TXOPs in the second service interval of the basic service set BSS2 do overlap with the reserved TXOPs in the second and third service intervals of the basic service set BSS1.

Figure 7B:
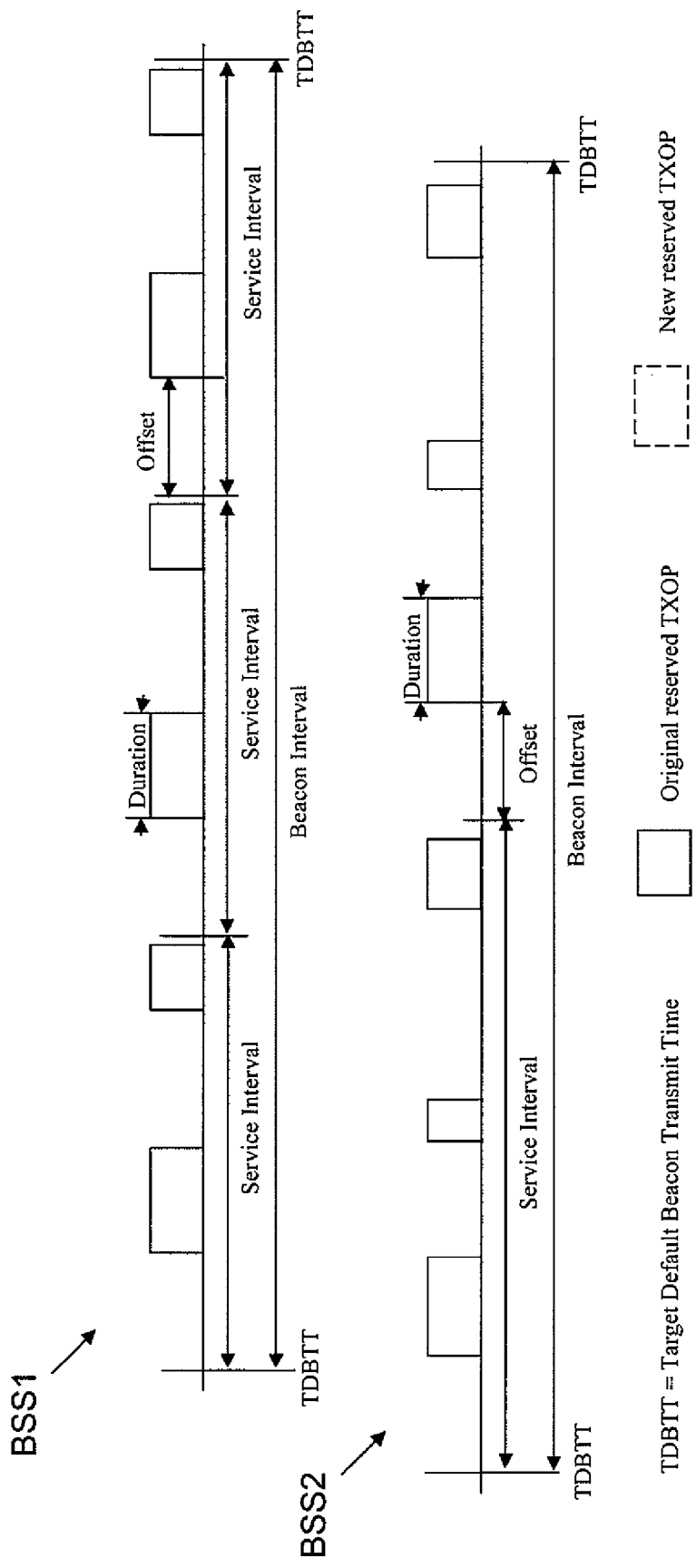
FIG. 7B is a simplified diagram of collision avoidance for inter-basic service set broadcast or multicast transmissions according to yet another embodiment.

FIG. 7B illustrates collision avoidance for inter-basic service set broadcast or multicast transmissions according to yet another embodiment. In one embodiment, the beacon interval of the access point is not used to select the service interval, offset, or duration of the reserved TXOP. In an embodiment, the default beacon interval is used to select the service interval, offset, or duration of the reserved TXOP. The difference between the TBTT and the target default beacon transmit time (TDBTT) is included in the reserved TXOP information element. In another embodiment, when a reserved service interval of a basic service set covers its own TBTT, the respective access point extends the reserved service interval to compensate the beacon transmit time.

As shown in FIG. 7B, both basic service sets BSS1 and BSS2 use the default beacon interval, i.e., the duration between two adjacent TDBTTs, to select TXOPs, overlap between the reserved TXOPs of the basic service sets BSS1 and BSS2 can be avoided. In particular, so long as the basic service sets BSS1 and BSS2 reserve TXOPs that do not overlap with any TXOP reserved by the overlapping basic service set BSS1 or BSS2, overlap between reserved TXOPs should be avoided because the TDBTT is the same for both of the basic service sets BSS1 and BSS2.

Figure 8B:
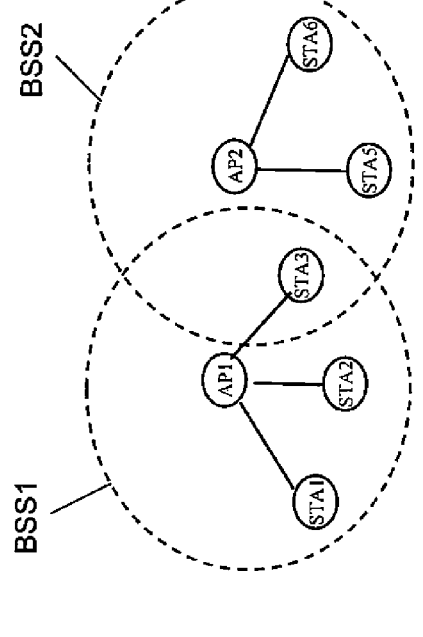
FIG. 8B is a simplified diagram of inter-basic service set interference and collision avoidance when an access point receives reserved TXOP information element from an overlapping basic service set's station according to one embodiment.
Figure 8A:
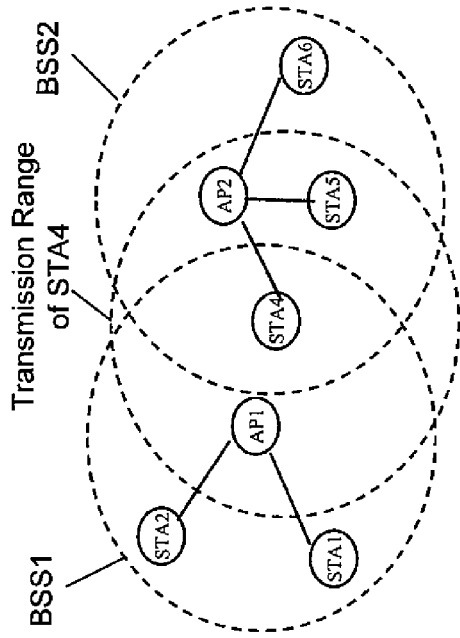
FIG. 8A is a simplified diagram of inter-basic service set interference and collision avoidance when a station receives reserved TXOP information element from an overlapping basic service set's access point according to one embodiment.

FIG. 8A illustrates inter-basic service set interference and collision avoidance when a station receives reserved TXOP information element from an overlapping basic service set's access point according to one embodiment. As shown in FIG. 8A, the station STA4 of the basic service set BSS2 and the access point AP1 of the basic service set bSS1 interfere each other, given the proximity between the two. The station STA4 receives reserved broadcast or multicast TXOP information element from the access point AP1 through management frames. In one embodiment, during the reserved TXOP of the basic service set BSS1, the station STA4 refrains from receiving management frames, data frames, or control frames including acknowledgement (ACK) frames from the basic service set BSS2. Further, during the reserved TXOP of the basic service set BSS1, station STA4 refrains from transmitting unicast frames requiring ACK, although the station STA4 may transmit non-ACK frames. Moreover, the access point AP2 of the basic service set BSS2 does not broadcast frames or multicast frames if the multicast address includes the station STA4 during the reserved TXOP of the basic service set BSS1. In another embodiment, the station STA4 relays the reserved broadcast or multicast TXOP information element received from the access point AP1 to its associated access point, AP2, to notify access point AP2 of the reserved TXOP of the basic service set BSS1. Such information may be relayed using an action frame, for example.

FIG. 8B illustrates inter-basic service set interference and collision avoidance when an access point receives reserved TXOP information element from an overlapping basic service set's station according to one embodiment. As shown in FIG. 8B, the station STA3 of the basic service set BSS1 and the access point AP2 of the basic service set bSS2 interfere each other, given the proximity between the two. The access point AP2 receives reserved broadcast or multicast TXOP information element from the station STA3 through management frames. In one embodiment, during the reserved TXOP of the basic service set BSS1, the access point AP2 refrains from transmitting management frames, data frames, or control frames including ACK frames. Further, during the reserved TXOP of the basic service set BSS1, the access point AP2 refrains from acknowledging received unicast frames, although it may still receive non-ACK frames. In another embodiment, the station STA3 forwards the broadcast or multicast reserved TXOP information received from access point AP1 to its access point, AP2, to notify access point AP2 of the reserved TXOP of the basic service set BSS1.

Figure 8D:
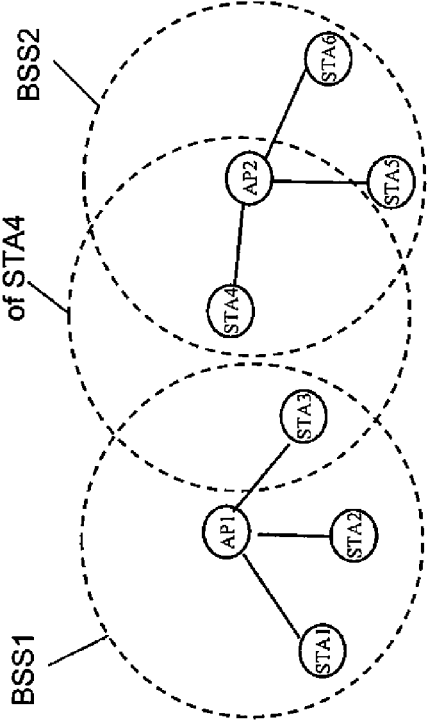
FIG. 8D is a simplified diagram of inter-basic service set interference and collision avoidance when a station receives reserved TXOP information element from an overlapping basic service set's station according to one embodiment.
Figure 8C:
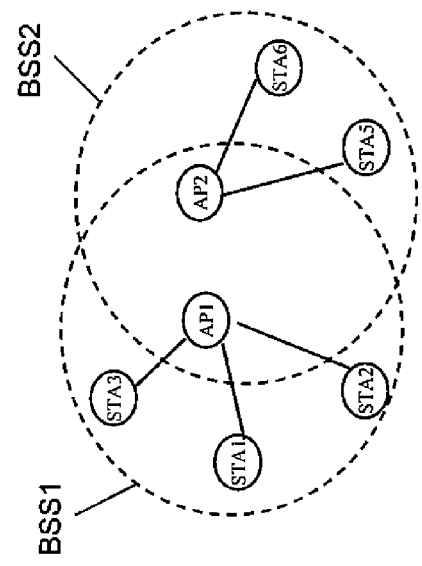
FIG. 8C is a simplified diagram of inter-basic service set interference and collision avoidance when an access point receives reserved TXOP information element from an overlapping basic service set's access point according to one embodiment.

FIG. 8C illustrates inter-basic service set interference and collision avoidance when an access point receives reserved TXOP information element from an overlapping basic service set's access point according to one embodiment. As shown in FIG. 8C, access point AP1 of the basic service set BSS1 and the access point AP2 of the basic service set bSS2 interfere each other, given the proximity between the two. The access point AP2 receives reserved broadcast or multicast TXOP information element from the access point AP1 through management frames. In one embodiment, during the reserved TXOP of the basic service set BSS1, the access point AP2 does not receive management frames, data frames, or control frames including ACK frames from its associated stations in the basic service set BSS2. Further, during the reserved TXOP of the basic service set BSS1, the access point AP2 transmits broadcast frames, multicast frames, and non-ACK frames. The access point AP2, however, refrains from transmitting unicast frames that require acknowledgement during the reserved TXOP of the basic service set BSS1. To fully protect video transmission, in one embodiment, the station STA4 relays the periodic broadcast or multicast reserved TXOP information element received from the access point AP1 to its associated access point, AP2, to notify access point AP2 of the reserved TXOP of the basic service set BSS1.

FIG. 8D illustrates inter-basic service set interference and collision avoidance when a station receives reserved TXOP information element from an overlapping basic service set's station according to one embodiment. As shown in FIG. 8D, the station STA3 of the basic service set BSS1 and the station STA4 of the basic service set bSS2 interferes each other, given the proximity between the two. The station STA4 receives reserved broadcast or multicast TXOP information element from the station STA3 through management frames. In one embodiment, during the reserved TXOP of the basic service set BSS1, the station STA4 refrains from transmitting management frames, data frames, and control frames including ACK frames. Further, during the reserved TXOP of the basic service set BSS1, the station STA4 refrains from acknowledging received unicast frames although it may still receive unicast no-ACK frames. In one embodiment, during the reserved TXOP of the basic service set BSS1, the access point AP2 transmits broadcast or multicast frames and the station STA4 receives broadcast or multicast frames. In another embodiment, the station STA3 relays the reserved broadcast or multicast TXOP information element received from the access point AP1 to the station STA4, so that the station STA4 can relay such information to its associated access point, AP2, to notify access point AP2 of the reserved TXOP of the basic service set BSS1.

Figure 9:
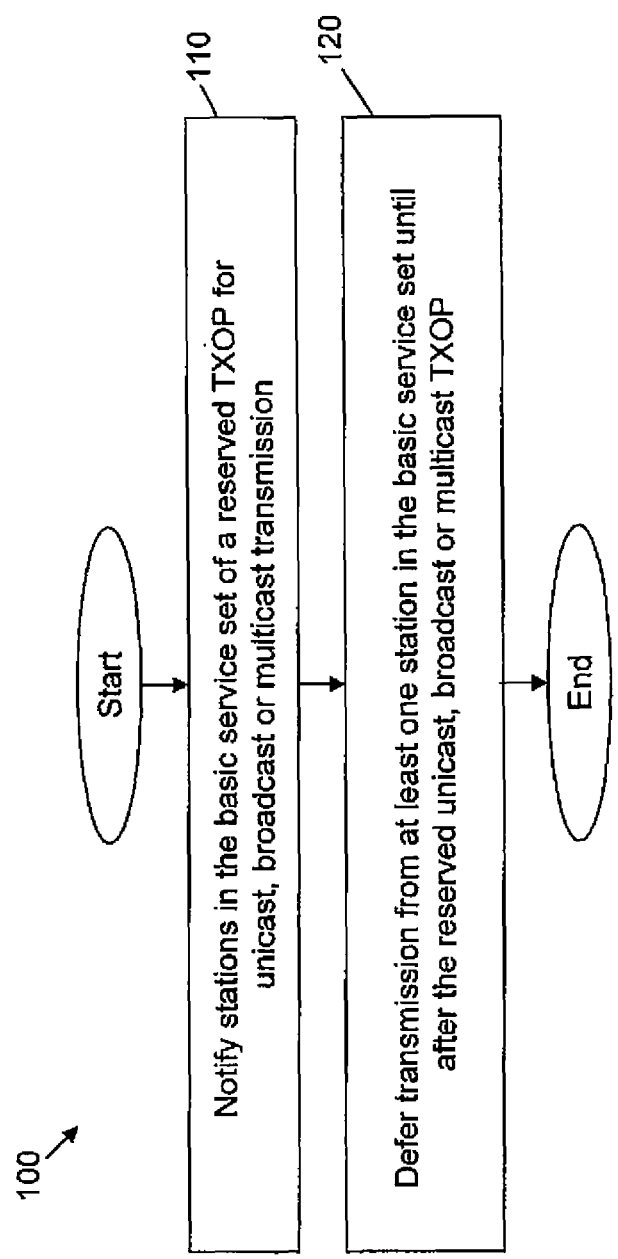
FIG. 9 is a flow chart of a process for avoiding collision of intra-basic service set unicast, broadcast or multicast transmissions according to one embodiment.

FIG. 9 illustrates a process 100 of avoiding collision of intra-basic service set broadcast or multicast transmissions according to one embodiment. At 110, stations in the basic service set are notified of a reserved TXOP for broadcast or multicast transmission. At 120, transmission from at least one station in the basic service set is deferred until after the reserved broadcast or multicast TXOP.

In one embodiment, the notification comprises broadcasting a reserved TXOP information element related to the reserved TXOP. In another embodiment, the reserved TXOP information element is broadcasted in one or more beacon by the access point of the basic service set. Alternatively, the reserved TXOP information element is broadcasted by the access point in one or more action frame. In one embodiment, the reserved TXOP information element includes one or more of the following: an active indication of whether or not the TXOP is currently enabled, an activation start time to indicate a time when the TXOP will be enabled if the TXOP is not currently enabled, a TXOP type, a source address, a destination address, a service interval, an offset to the service interval, and a duration of the TXOP.

As it is possible that one or more of the stations in the basic service set may be in a power saving mode, the access point may need to broadcast the reserved TXOP information element at a time other than during the regular beacon broadcast to ensure all stations associated with the access point, i.e., all the stations in the basic service set, receive the reserved TXOP information element. Accordingly, in one embodiment, the access point broadcasts the reserved TXOP information element using a DTIM beacon. In one embodiment, upon being notified of the reserved broadcast or multicast TXOP, a station in the basic service set sets a network allocation vector (NAV) to stop frame transmission during the reserved broadcast or multicast TXOP. In another embodiment, all stations in the basic service set will set the NAV to refrain from transmission during the reserved TXOP upon being notified of the reserved TXOP.

Figure 10A:
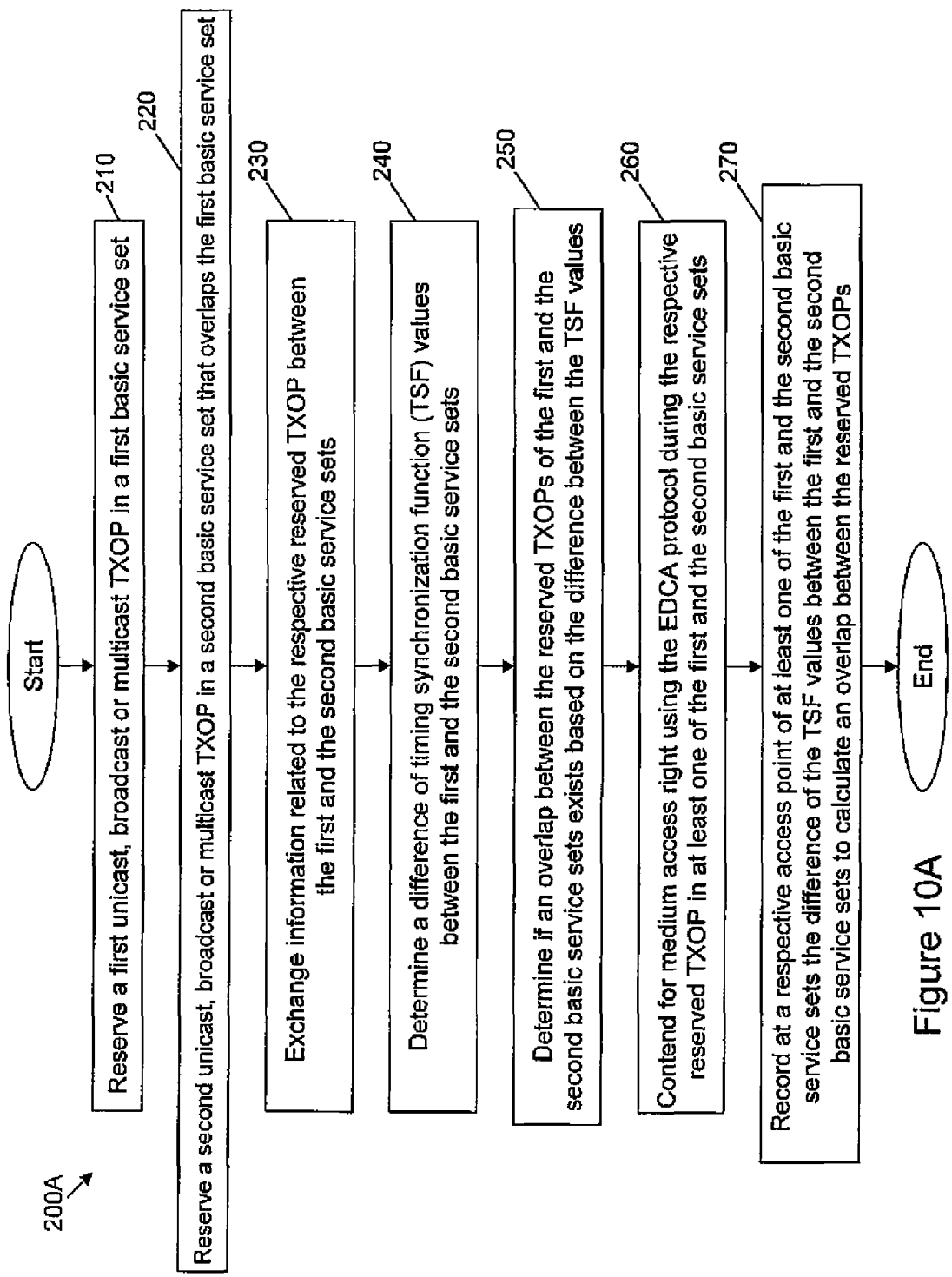
FIG. 10A is a flow chart of a process for avoiding collision of inter-basic service set unicast, broadcast or multicast transmissions according to one embodiment.

FIG. 10A illustrates a process 200A for avoiding collision of inter-basic service set uncast, broadcast or multicast transmissions according to one embodiment. At 210, a first unicast, broadcast or multicast TXOP is reserved in a first basic service set. At 220, a second unicast, broadcast or multicast TXOP is reserved in a second basic service set, where the reserved second TXOP overlaps the reserved first TXOP. At 230, the first and the second basic service sets exchange information related to the respective reserved TXOP, namely the first TXOP and the second TXOP. At 240, a difference of TSF values between the first and the second basic service sets is determined. At 250, whether or not an overlap between the reserved first and second TXOPs exists is determined, based on the difference between the TSF values. At 260, in at least one of the first and the second basic service sets, medium access right is contended using the EDCA protocol during the respective reserved TXOP. At 270, the difference of the TSF values between the first and the second basic service sets is recorded at the respective access point of either or both of the first and the second basic service sets to calculate the overlap between the reserved first and second TXOPs.

Figure 10B:
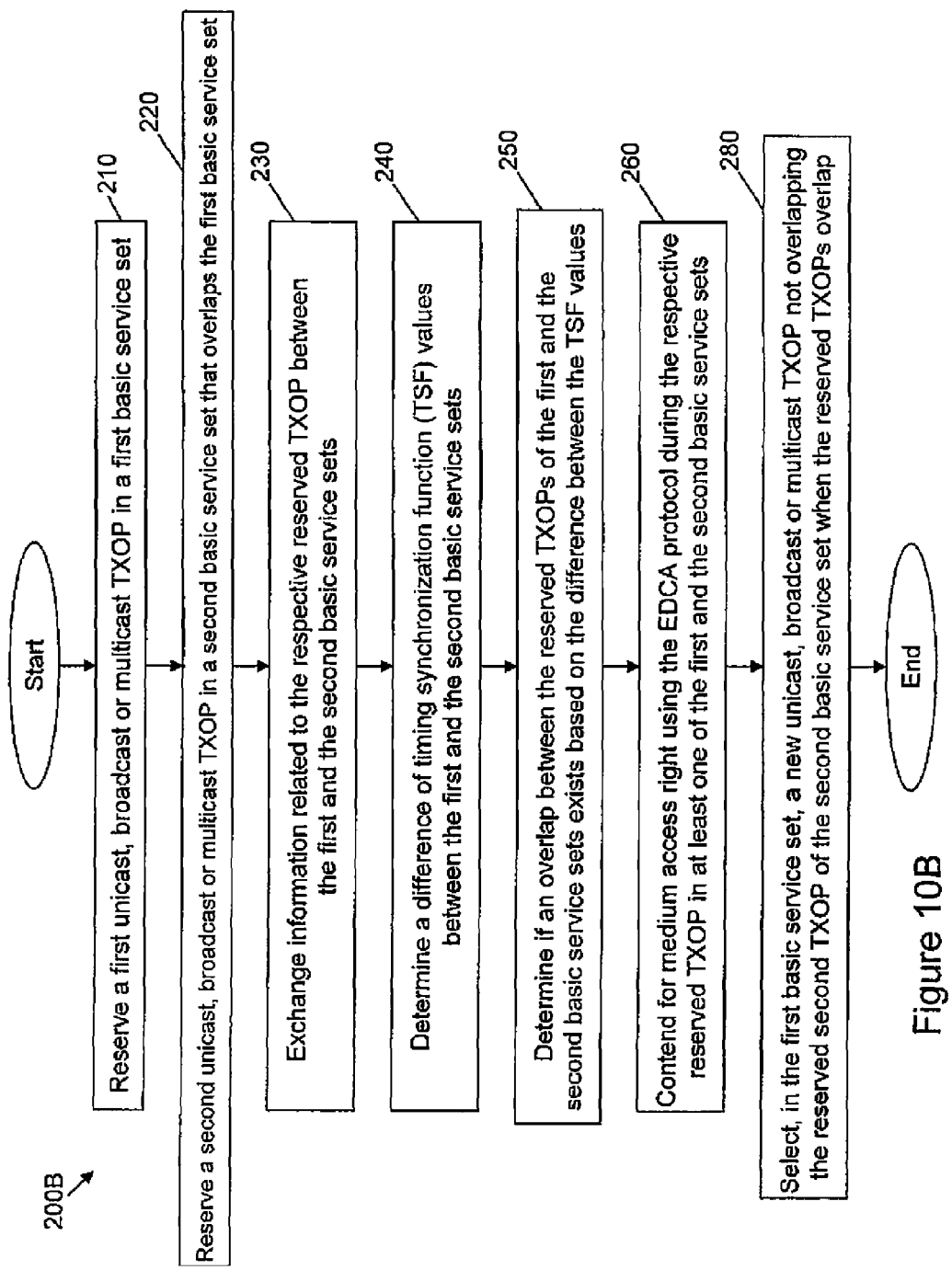
FIG. 10B is a flow chart of a process for avoiding collision of inter-basic service set unicast, broadcast or multicast transmissions according to another embodiment.

FIG. 10B illustrates a process 200B for avoiding collision of inter-basic service set unicast, broadcast or multicast transmissions according to another embodiment. At 210, a first unicast, broadcast or multicast TXOP is reserved in a first basic service set. At 220, a second unicast, broadcast or multicast TXOP is reserved in a second basic service set, where the reserved second TXOP overlaps the reserved first TXOP. At 230, the first and the second basic service sets exchange information related to the respective reserved TXOP, namely the first TXOP and the second TXOP. At 240, a difference of TSF values between the first and the second basic service sets is determined. At 250, whether or not an overlap between the reserved first and second TXOPs exists is determined, based on the difference between the TSF values. At 260, in at least one of the first and the second basic service sets, medium access right is contended using the EDCA protocol during the respective reserved TXOP. At 280, a new unicast, broadcast or multicast TXOP not overlapping the reserved second TXOP of the second basic service set is selected by the first basic service set when the reserved first TXOP of the first basic service set overlaps the reserved second TXOP of the second basic service set. Alternatively, a new unicast, broadcast or multicast TXOP not overlapping the reserved first TXOP of the first basic service set is selected by the second basic service set when the reserved second TXOP of the second basic service set overlaps the reserved first TXOP of the first basic service set.

In one embodiment, information related to the respective reserved TXOP between the first and the second basic service sets is exchanged using relayed action management frames. In another embodiment, the exchange is consummated using relayed action management frames through stations of the first and the second basic service sets. For example, if station 1 of the first basic service set is within the transmission range of the second basic service set and station 2 of the second basic service set is within the transmission range of the first basic service set, then information related to the reserved first and second TXOPs is exchanged through station 1 and station 2.

Figure 11:
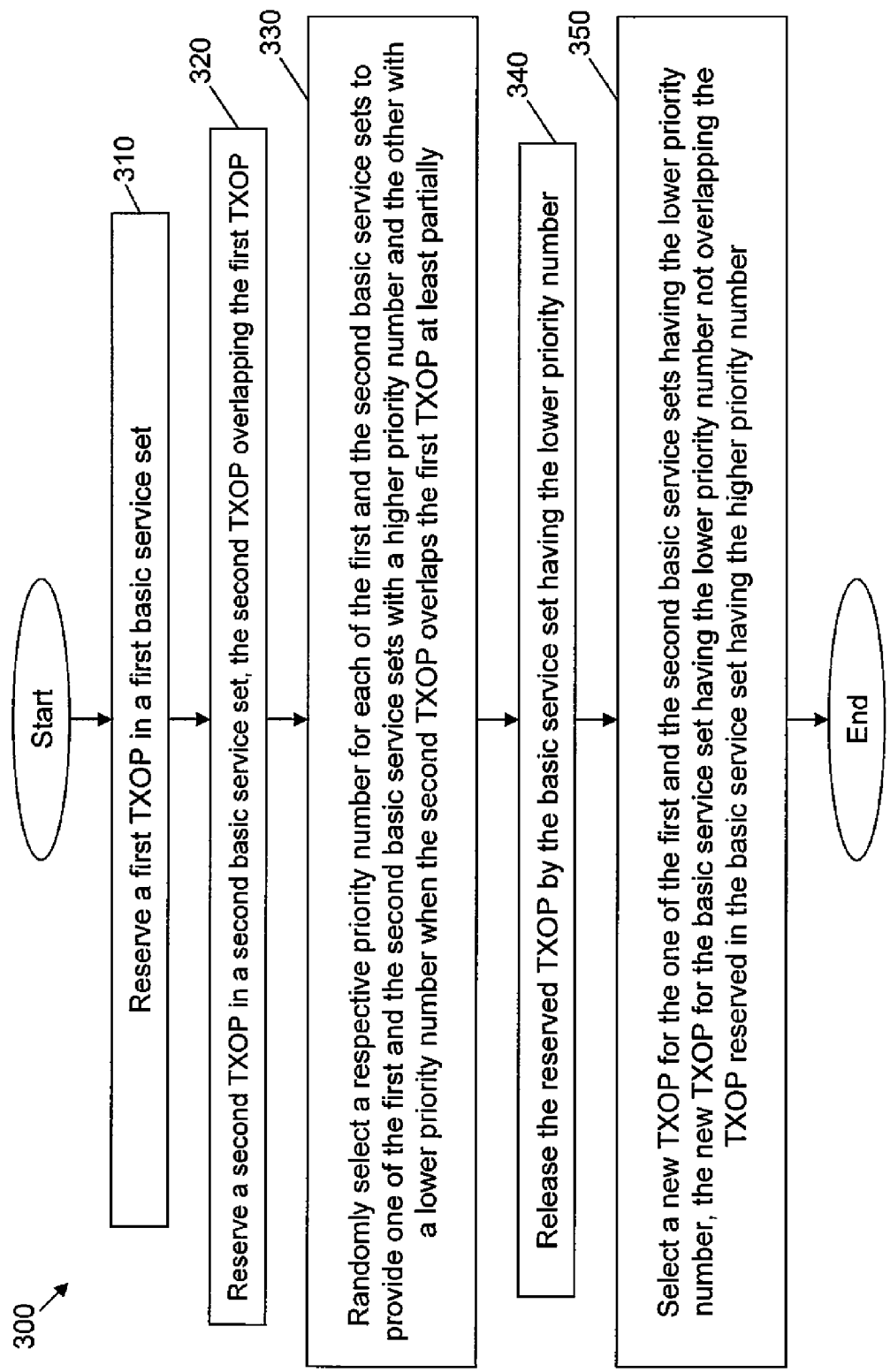
FIG. 11 is a flow chart of a process for avoiding collision of inter-basic service set unicast, broadcast or multicast transmissions according to another embodiment.

FIG. 11 illustrates a process 300 for avoiding collision of inter-basic service set unicast, broadcast or multicast transmissions according to another embodiment. At 310, a first TXOP is reserved in a first basic service set. At 320, a second TXOP is reserved in a second basic service set, where the second TXOP overlaps the first TXOP reserved by the first basic service set. At 330, a respective priority number is randomly selected for each of the first and the second basic service sets. This provides one of the first and the second basic service sets with a higher priority number and the other with a lower priority number. At 340, the basic service set having the lower priority number releases the reserved TXOP. At 350, the basic service set having the lower priority number, after releasing the respective TXOP, selects a new TXOP that does not overlap the TXOP reserved in the basic service set having the higher priority number. Thus, it is believed the process 300 may break a tie between two overlapping basic service sets when each basic service set reserves a TXOP that overlaps the TXOP of the other basic service set.

Figure 12A:
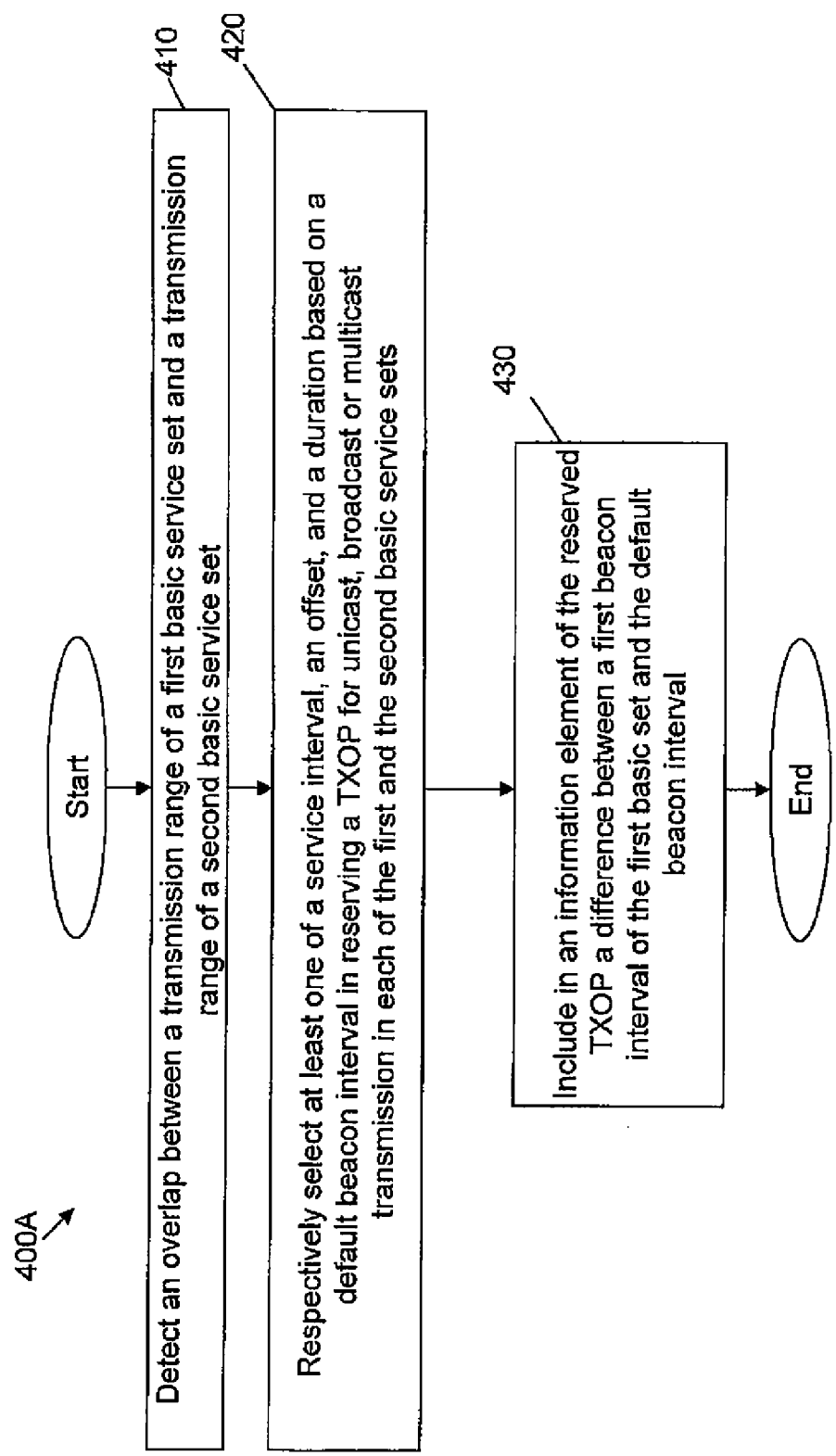
FIG. 12A is a flow chart of a process for avoiding collision of inter-basic service set unicast, broadcast or multicast transmissions according to still another embodiment.

FIG. 12A illustrates a process 400A for avoiding collision of inter-basic service set unicast, broadcast or multicast transmissions according to still another embodiment. At 410, an overlap between a transmission range of a first basic service set and a transmission range of a second basic service set is detected. At 420, in reserving a TXOP for unicast, broadcast or multicast transmission in each of the first and the second basic service sets, at least one of a service interval, an offset, and duration is respectively selected based on a default beacon interval. In one embodiment, the first basic service set has a first beacon interval and the second basic service set has a second beacon interval that is different from the first beacon interval. At 430, a difference between a first beacon interval of the first basic service set and the default beacon interval is included in a reserved TXOP information element that is broadcasted to stations in the first basic service set. Alternatively, a difference between a second beacon interval of the second basic service set and the default beacon interval is included in a reserved TXOP information element that is broadcasted to stations in the second basic service set.

Figure 12B:
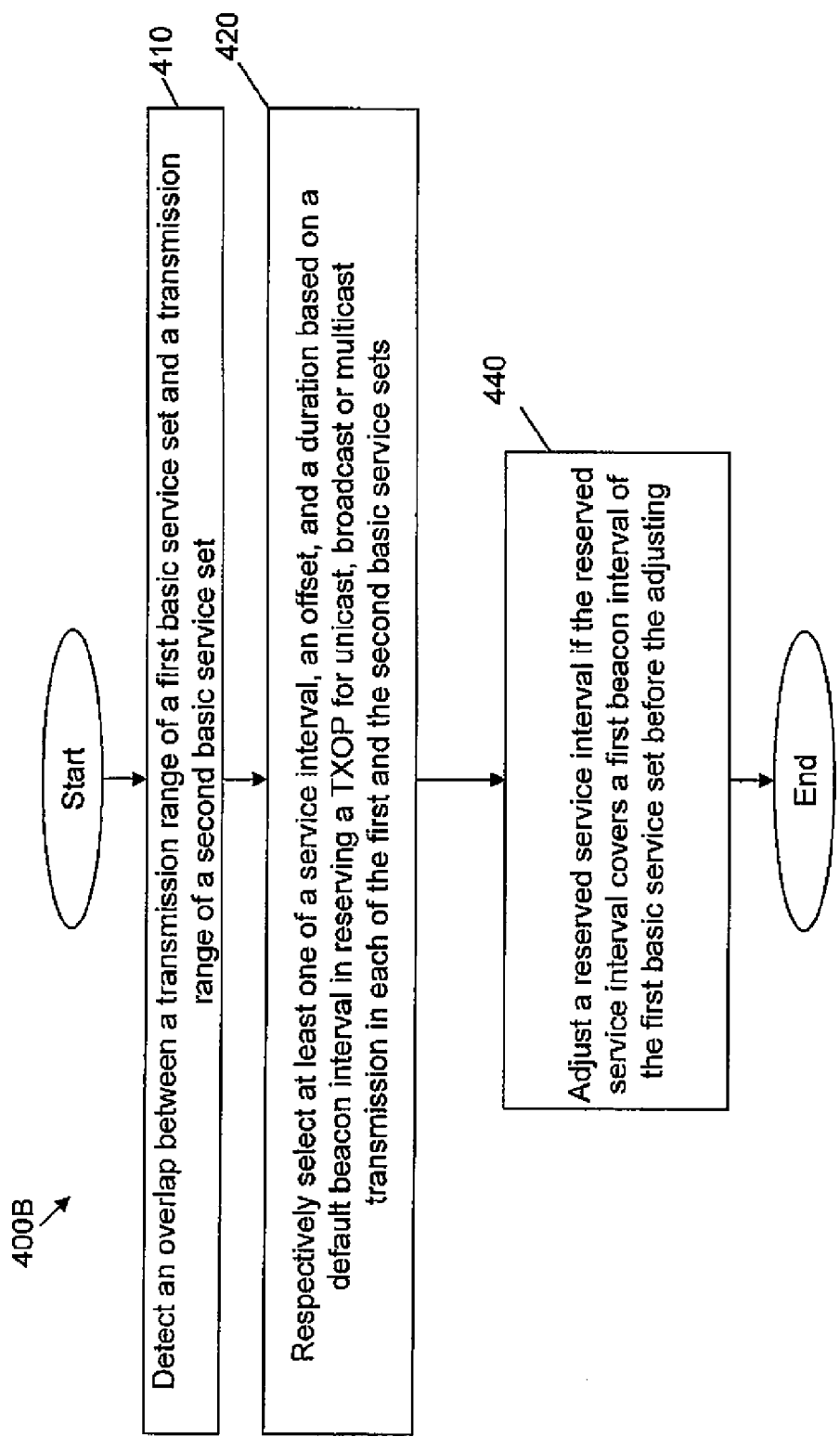
FIG. 12B is a flow chart of a process for avoiding collision of inter-basic service set unicast, broadcast or multicast transmissions according to yet another embodiment.

FIG. 12B illustrates a process 400B for avoiding collision of inter-basic service set unicast, broadcast or multicast transmissions according to yet another embodiment. At 410, an overlap between a transmission range of a first basic service set and a transmission range of a second basic service set is detected. At 420, in reserving a TXOP for unicast, broadcast or multicast transmission in each of the first and the second basic service sets, at least one of a service interval, an offset, and duration is respectively selected based on a default beacon interval. In one embodiment, the first basic service set has a first beacon interval and the second basic service set has a second beacon interval that is different from the first beacon interval. At 440, a reserved service interval is adjusted if the reserved service interval covers a first beacon interval of the first basic service set before the adjusting. Alternatively, a reserved service interval is adjusted if the reserved service interval covers a second beacon interval of the second basic service set before the adjusting. For example, the access point of the first basic service set may extend the reserved service interval to compensate the beacon transmit time when the reserved service interval covers the TBTT of the first basic service set. In one embodiment, upon detecting an overlap between the transmission ranges of the first and the second basic service sets, the first basic service set reserves a first TXOP based on the default beacon interval and the second basic service set reserves a second TXOP not overlapping the first TXOP based on the default beacon interval.

Figure 13:
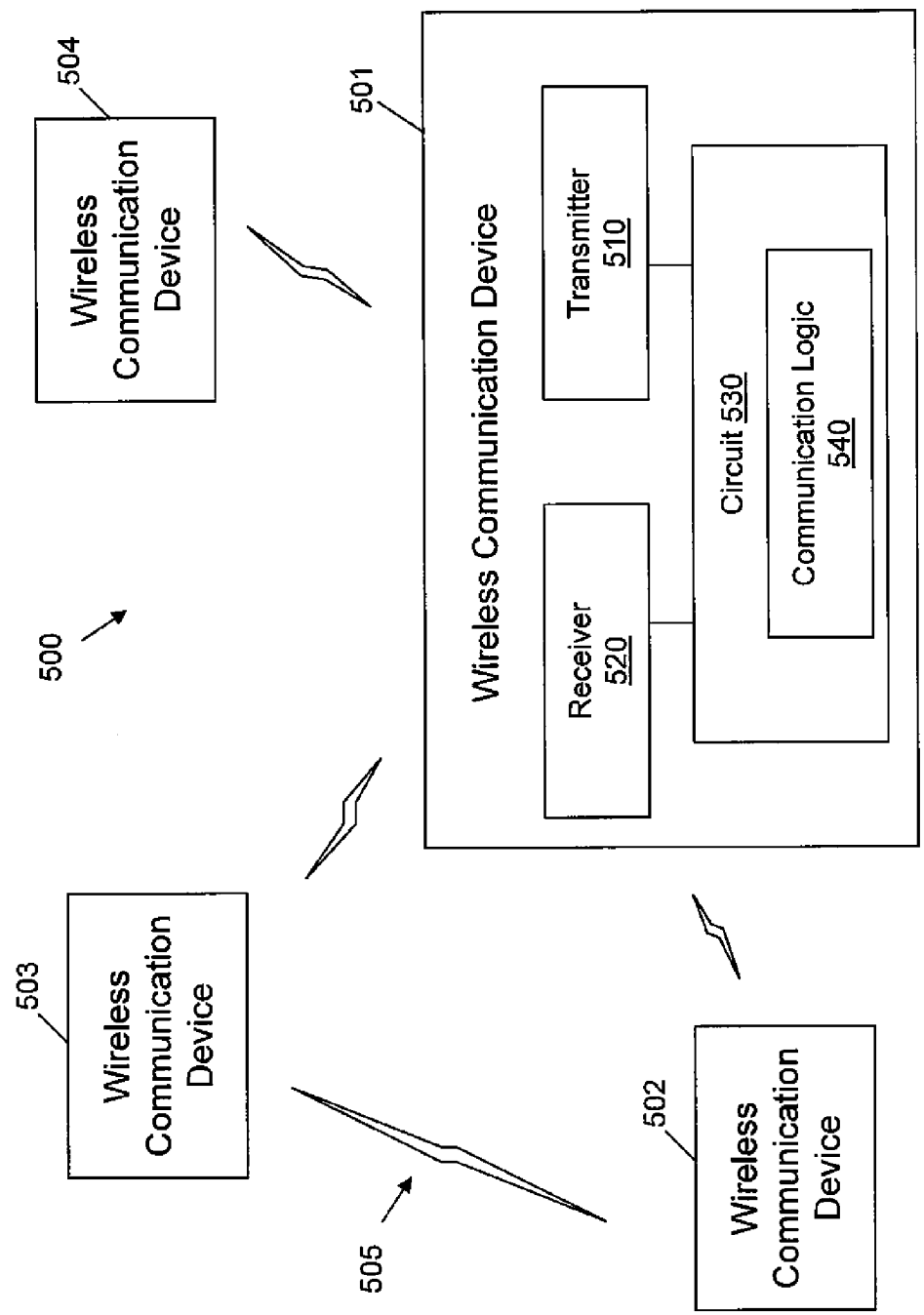
FIG. 13 is a simplified block diagram of a wireless communication device in a WLAN communication system according to one embodiment.

FIG. 13 illustrates a wireless communication device 501 in a WLAN communication system 500 according to one embodiment. The wireless communication device 501 includes a transmitter 510, a receiver 520, and a circuit 530. The control circuit 530 includes communication logic 540. The communication logic 540 is configured to notify other wireless communication devices in the system 500 of a reserved TXOP for unicast, broadcast or multicast transmission. The wireless communication device 501 is also configured to cause the transmitter 510 of the wireless communication device 501 to cease transmission during a TXOP reserved by another wireless communication device.

The system 500 is a basic service set that includes the wireless communication device 501 and other wireless communication device 502, 503 and 504. The wireless communication devices 501, 502, 503 and 504 communicate with each other via the transmission medium 505 wirelessly, for example, according to the IEEE 802.11 standards, including the protocols defined in the IEEE 802.11e amendment. In one embodiment, one or more of the wireless communication devices 502, 503, and 504 are structurally and/or functionally the same as the wireless communication devices 501. In another embodiment, one or more of the wireless communication devices 502, 503, and 504 are structurally and/or functionally different from the wireless communication devices 501. It should be understood that, although four wireless communication devices 501-504 illustrated in the system 500, there may be more or fewer wireless communication devices in the system 500 in other embodiments.

In one embodiment, the communication logic 540 is configured to cause the wireless communication device 501 to exchange information related to a respective reserved TXOP with another wireless communication device 502, 503, or 504 in a second basic service set to determine a difference of TSF values between the first and the second basic service sets. Based on the difference of TSF values, the communication logic 540 determines whether or not there is an overlapping reserved TXOP between the first and the second basic service sets. In one embodiment, the communication logic 540 contends for medium access right using the EDCA protocol during the reserved TXOP.

In another embodiment, the communication logic 540 randomly selects a priority number if the TXOP reserved by the communication logic 540 overlaps a reserved TXOP of a second basic service set. The communication logic 540 causes the wireless communication device 501 to release the reserved TXOP if the randomly selected priority number is lower than a randomly selected priority number for the second basic service set, and to select a new TXOP that does not overlap the reserved TXOP of the second basic service set. In yet another embodiment, the communication logic 540 uses the default beacon interval to select at least one of a service interval, an offset, and duration in reserving a TXOP for broadcast or multicast transmission.

Thus, embodiments of an inventive scheme to avoid collisions of inter- and intra-basic service set broadcast or multicast transmissions have been disclosed. The implementation scheme according to the various embodiments disclosed herein provides several advantages over the conventional implementation of transmission of video frames. For instance, to avoid intra-basic service set collisions, stations in a basic service set are notified of a reserved TXOP for broadcast or multicast transmission so that the stations can defer transmission until after the reserved broadcast or multicast TXOP. There is no physical layer modification is necessary to implement the proposed scheme, yet robust broadcast/multicast transmission of video frames may be achieved.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of transmission of video frames generally described above. It will be understood by those skilled in the art that, although the embodiments described above and shown in the figures are generally directed to the context of transmission of video frames, applications related to transmission of high-priority frames other than video frames, for example, may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of avoiding collision of inter-basic service set unicast, broadcast or multicast transmissions, the method comprising:
reserving a first unicast, broadcast or multicast transmit opportunity in a first basic service set;
reserving a second unicast, broadcast or multicast transmit opportunity in a second basic service set that overlaps the first basic service set;
exchanging information related to the respective reserved transmit opportunity between the first and the second basic service sets;
determining a difference of timing synchronization function (TSF) values between the first and the second basic service sets;
determining if an overlap between the reserved transmit opportunities of the first and the second basic service sets exists based on the difference between the TSF values; and
contending for medium access right using the Enhanced Distributed Channel Access (EDCA) protocol during the respective reserved transmit opportunity in at least one of the first and the second basic service sets.

2. The method of claim 1 wherein exchanging information related to the respective reserved transmit opportunity between the first and the second basic service sets comprises exchanging information related to the respective reserved transmit opportunity between the first and the second basic service sets through relayed action management frames using stations of the first and the second basic service sets.

3. The method of claim 1, further comprising:
recording at an access point of at least one of the first and the second basic service sets the difference of the TSF values between the first and the second basic service sets to calculate an overlap between the reserved transmit opportunities of the first and the second basic service sets.

4. The method of claim 1, further comprising:
selecting in the first basic service set a new unicast, broadcast or multicast transmit opportunity not overlapping the reserved second transmit opportunity of the second basic service set when the reserved first transmit opportunity of the first basic service set overlaps the reserved second transmit opportunity of the second basic service set.

5. A method of avoiding collision of inter-basic service set unicast, broadcast or multicast transmissions, the method comprising:
reserving a first transmit opportunity in a first basic service set;
reserving a second transmit opportunity in a second basic service set that overlaps the first basic service set, the second transmit opportunity overlapping the first transmit opportunity;
randomly selecting a respective priority number for each of the first and the second basic service sets to provide one of the first and the second basic service sets with a higher priority number and the other with a lower priority number when the second transmit opportunity overlaps the first transmit opportunity at least partially; and
releasing the reserved transmit opportunity by the basic service set having the lower priority number.

6. The method of claim 5, further comprising:
selecting a new transmit opportunity for the one of the first and the second basic service sets having the lower priority number, the new transmit opportunity for the basic service set having the lower priority number not overlapping the transmit opportunity reserved in the basic service set having the higher priority number.

7. A method of avoiding collision of inter-basic service set unicast, broadcast or multicast transmissions, the method comprising:
detecting an overlap between a transmission range of a first basic service set and a transmission range of a second basic service set; and
respectively selecting at least one of a service interval, an offset, and a duration based on a default beacon interval or a default delivery traffic indication message (DTIM) beacon in reserving a transmit opportunity for a unicast, broadcast or multicast transmission in each of the first and the second basic service sets wherein selecting a duration based on the default DTIM beacon in reserving a transmit opportunity for a unicast, broadcast or multicast transmission in each of the first and the second basic service sets includes:
reserving a first transmit opportunity in the first basic service set based on the default DTIM beacon; and
reserving a second transmit opportunity in the second basic service set based on the default DTIM beacon, the first transmit opportunity and the second transmit opportunity not overlapping.

8. The method of claim 7 wherein the first basic service set has a first beacon interval and the second basic service set has a second beacon interval, and
wherein the first beacon interval and the second beacon interval are different.

9. The method of claim 7 wherein respectively selecting at least one of a service interval, an offset, and a duration based on the default beacon interval or the default DTIM beacon in reserving a transmit opportunity for a unicast, broadcast or multicast transmission in each of the first and the second basic service sets comprises: reserving a first transmit opportunity in the first basic service set based on the default beacon interval or the default DTIM beacon; and
reserving a second transmit opportunity in the second basic service set based on the default beacon interval or the default DTIM beacon, the first transmit opportunity and the second transmit opportunity not overlapping.

10. The method of claim 7, further comprising indicating in an information element of the reserved transmit opportunity a difference between a first beacon interval of the first basic set and the default beacon interval.

11. The method of claim 7, further comprising:
adjusting a reserved service interval if the reserved service interval covers a first beacon interval of the first basic service set before the adjusting.

12. A circuit in a first wireless communication device of a first basic service set, comprising:
communication logic configured to:
generate a transmit opportunity information element to reserve a transmit opportunity for a unicast, broadcast or multicast transmission;
cause the first wireless communication device to cease transmission during a transmit opportunity reserved by another wireless communication device; and
use a default beacon interval or a default delivery traffic indication message (DTIM) beacon interval to select at least one of a service interval, an offset, and a duration in reserving a transmit opportunity for the unicast, broadcast or multicast transmission, wherein using a default delivery traffic indication message (DTIM) beacon interval to select at least one of a service interval, an offset, and a duration selecting a duration based on the default DTIM beacon in reserving a transmit opportunity for a unicast, broadcast or multicast transmission in each of the first and the second basic service sets includes:
reserving a first transmit opportunity in the first basic service set based on the default DTIM beacon; and
reserving a second transmit opportunity in the second basic service set based on the default DTIM beacon, the first transmit opportunity and the second transmit opportunity not overlapping.

13. The circuit of claim 12 wherein the communication logic is further configured to contend for medium access rights using the Enhanced Distributed Channel Access (EDCA) protocol during the reserved transmit opportunity.

14. The circuit of claim 12 wherein the communication logic is further configured to randomly select a priority number if the reserved transmit opportunity overlaps a reserved transmit opportunity of a second basic service set, to release the reserved transmit opportunity if the randomly selected priority number is lower than a randomly selected priority number for the second basic service set, and to select a new transmit opportunity not overlapping the reserved transmit opportunity of the second basic service set.

* * * * *